(12) United States Patent
Lian et al.

(10) Patent No.: US 12,450,091 B2
(45) Date of Patent: Oct. 21, 2025

(54) SYMBOLIC STATE ESTIMATION FOR CONTACT-RICH MANIPULATION TASKS

(71) Applicant: Intrinsic Innovation LLC, Mountain View, CA (US)

(72) Inventors: Wenzhao Lian, Fremont, CA (US); Stefan Schaal, Mountain View, CA (US); Takatoki Migimatsu, San Rafael, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 384 days.

(21) Appl. No.: 17/934,459

(22) Filed: Sep. 22, 2022

(65) Prior Publication Data

US 2024/0111571 A1    Apr. 4, 2024

(51) Int. Cl.
*G06F 9/48* (2006.01)
*G06N 5/02* (2023.01)

(52) U.S. Cl.
CPC ............ *G06F 9/4881* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 2018/0005118 A1* | 1/2018 | Kapoor | G06N 7/01 |
| 2022/0402123 A1* | 12/2022 | Niemueller | B25J 9/1661 |
| 2023/0099243 A1* | 3/2023 | Kapsalakis | G06F 18/213 |
| | | | 709/224 |

* cited by examiner

*Primary Examiner* — Adam Lee
(74) *Attorney, Agent, or Firm* — Fish & Richardson P.C.

(57) ABSTRACT

Methods, systems, and apparatus, including computer programs encoded on computer storage media, for controlling a robot using symbolic states. One of the methods includes receiving a definition of a task having multiple task states, wherein each task state is associated with a different respective control policy; executing the task using an initial control policy associated with an initial task state; during execution of the task, continually generating, from sensor data, a prediction of the task state of the task; and upon determining that a transition to a different task state has occurred, transitioning the robot to a different control policy associated with the different task state.

20 Claims, 4 Drawing Sheets

SYMBOLIC STATE ESTIMATION FOR CONTACT-RICH MANIPULATION TASKS

BACKGROUND

This specification relates to robotics, and more particularly to planning robotic movements.

Robotic manipulation refers to controlling the physical movements of robots in order to perform tasks. Robotic manipulation tasks require a robotic component, e.g., an end effector, to physically contact an object to effectuate some change in the object. For example, an industrial robot that builds cars can be programmed to first pick up a car part and then weld the car part onto the frame of the car. In another example, a robot may by trained to grasp a connector or peg and insert the part into a socket or hole.

Solving robotic manipulation tasks robustly under perception uncertainty is a challenging problem. State estimation methods seek to solve this problem by predicting the ground truth state of the environment from noisy observations. Typical state representations are object poses, which are continuously estimated and then used to guide the robot's motion, for example, by aligning an end-effector with a door knob. However, conventional state estimation techniques are highly susceptible to noise and require vast amounts of training data. Moreover, once trained, conventional state estimation techniques are not generalizable to other tasks.

SUMMARY

This specification describes techniques for predicting symbolic states of robotic tasks using intermediate predicate classifiers. In general, symbolic states abstract away geometric information and characterize the functional properties of the environment, such as whether two objects are aligned, whether an object is open or closed, or other complex traits. And rather than converting high-dimensional sensor observations to symbolic states directly, the techniques described in this specification instead represent symbolic states from a collection of one or more predicates and then predict the values of the predicates from sensor data in order to determine the higher-level symbolic states.

In this specification, a predicate is an expression having one or more variables that can be evaluated to generate a discrete output. A binary predicate, for example, produces one of two output values, e.g., 0 or 1; or true or false. In this specification, a predicate classifier is a functional subsystem that uses sensor data to predict the output value of a predicate. For example, one example predicate that can be used in the space of robotic manipulation tasks can be force_dropping (f), where f represents input from a force sensor. A predicate classifier can thus be programmed or trained to generate a true/false output value depending on whether or not sensor readings from the force sensor are dropping or not dropping. As described in more detail below, representing higher level symbolic states as a collection of predicate values makes the system robust to noise and also makes the system more easily adaptable to other tasks.

Particular embodiments of the subject matter described in this specification can be implemented so as to realize one or more of the following advantages. Using predicate classifiers makes training the system more data efficient because training binary classifiers requires far less data than training a multi-output state classifier end to end. Further, atomic predicate classifiers, if trained on a diverse dataset, are generalizable to unseen tasks in the same task family. In addition, since predicates are modular, they can be composed and shared between tasks, and adding or removing states from the state space does not require retraining all the predicate classifiers. Experimental results indicate the techniques described below can achieve high levels of state estimation accuracy and task completion rate, outperforming other baselines. Another benefit of performing state estimation on high-level states is the ability to recover from high-level failures, for example, an object falling off a contact surface. The framework described below can handle these failure states by representing them in the main state space, which unifies the state and failure classification problems into one integrated pipeline. These techniques result in a symbolic state predictor that is robust to sensor noise and that can handle high-dimensional observations, such as image data, with a relatively small amount of training data, which makes the symbolic state predictor suitable for real world robotics applications. Once learned, the state estimator can be used to on any appropriate high-level execution model, including state machines. In addition, the predicate classifiers are semantically meaningful and explainable to developers and users, thus supporting their combination with rule-based classifiers.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
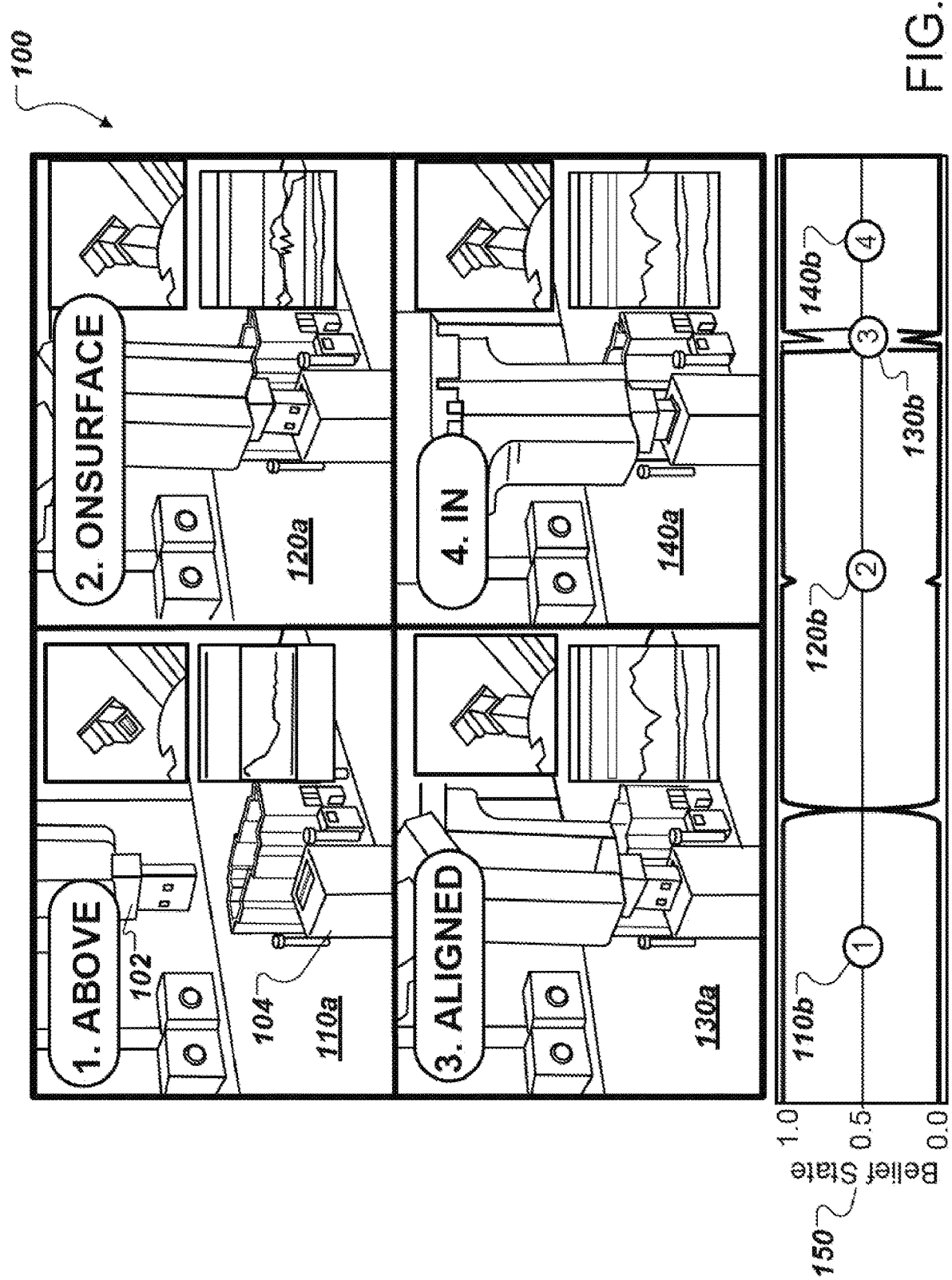
FIG. 1 illustrates different symbolic states in an example system embodiment.

FIG. 1 illustrates different symbolic states in an example system embodiment having a manipulator for moving a connector 102 into a target 104.

The system is an example of a system that can use symbolic state estimation for manipulation tasks. Predicate classifiers, which can be trained with relatively small datasets, can detect symbolic attributes from sensor inputs. The potentially noisy classifier outputs can then be fed to a trained state estimator in order to predict symbolic states. Suitable techniques for performing symbolic state estimation are described in more detail in, Toki Migimatsu et al., *Symbolic State Estimation with Predicates for Contact-Rich Manipulation Tasks*, published in the proceedings of the IEEE International Conference on Robotics and Automation (ICRA) 2022, which is herein incorporated by reference.

The execution trajectory illustrated shows the method applied to one instance, in this case a connector insertion task using a predefined set of manipulation control policies. The symbolic state estimator decides when to transition between control policies and identifies failure states.

The representative frames in each symbolic state are overlaid with the image, position, velocity, and force signals (with RGB lines representing XYZ axes). In this example, these symbolic states include ABOVE 110a, ONSURFACE 120a, ALIGNED 130a, and IN 140a. Other examples of this method may include more, or less, symbolic states. Below the visual depiction of the symbolic states is the estimated probability distribution 150 over the symbolic states. Each distribution function corresponds to its associated visual depiction, for example, the ABOVE probability distribution corresponds to 110b.

Figure 2:
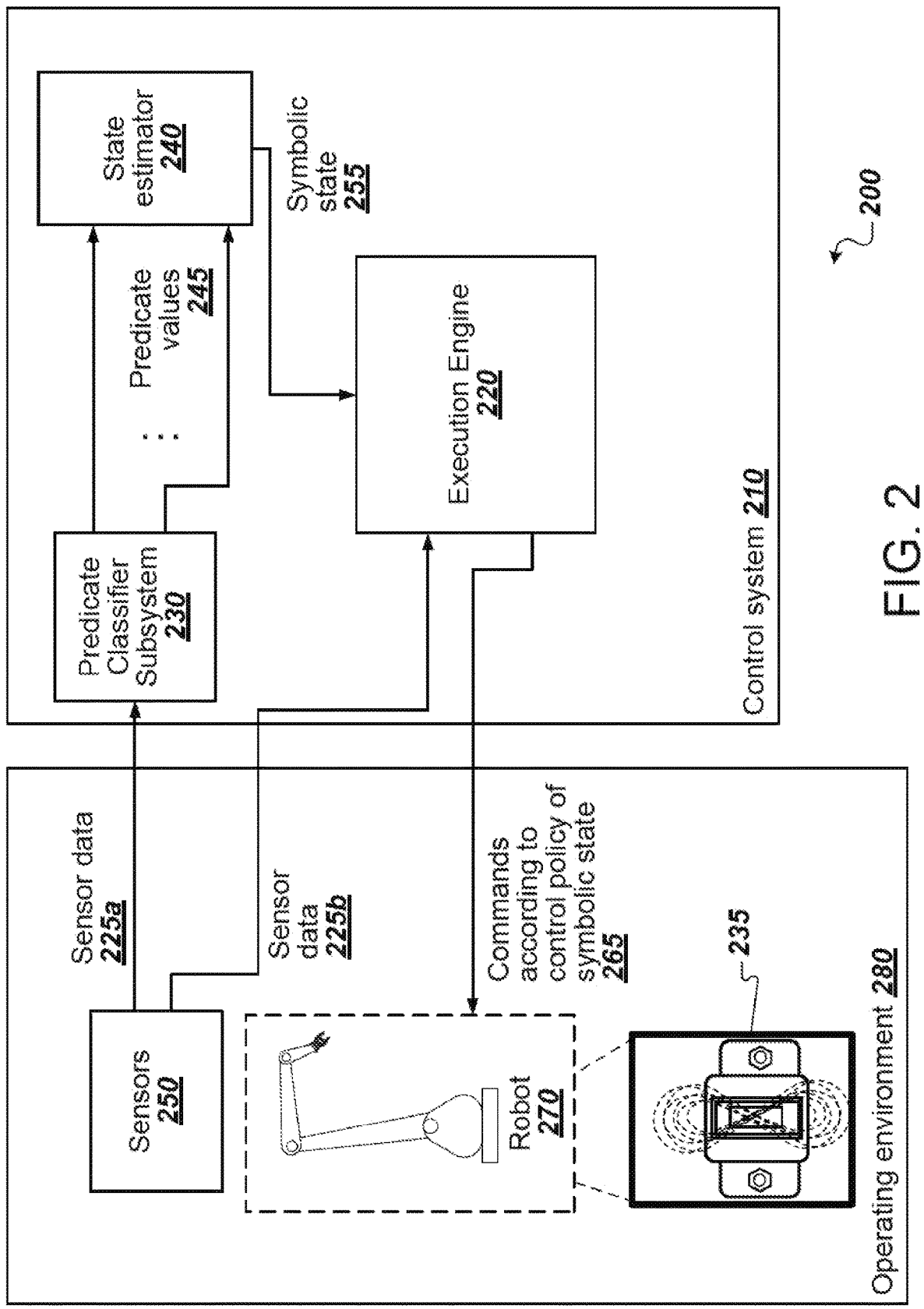
FIG. 2 is an diagram that illustrates an example system.

FIG. 2 is a diagram that illustrates an example system 200. The system 200 is an example of a robotics control system that can implement the robotic control techniques described in this specification. The system includes a control system 210 that operates to control a robot 270 in an operating environment 280.

The control system 200 includes a number of functional components, including a predicate classifier subsystem 230, a state estimator 240, and an execution engine 220. Each of these components can be implemented as computer programs installed on one or more computers in one or more locations that are coupled to each other through any appropriate communications network, e.g., an intranet or the Internet, or combination of networks.

In general, the execution engine 220 uses a symbolic state 255 generated by the state estimator 240 in order to choose a control policy for the robot 270. The execution engine 220 then continually provides commands 265 to the robot according to the current control policy of the task. In some implementations, the execution engine 220 consumes sensor data 225b generated by sensors 250 in the operating environment 280, which can also include status messages generated by the robots 270. The sensors can be mounted on stationary or movable surfaces in the operating environment 280.

As described throughout this specification, the state estimator 240 generates a predicted symbolic 255 according to predicate values 245 generated by respective predicate classifiers of a predicate classifier subsystem 230. The predicate classifiers can be implemented as machine-learning classifiers trained to ingest sensor data 225a from the operating environment 280 and to generate predicated predicate values 245.

The execution engine 220 and the state estimator 240 can operate according to different timing constraints. In some implementations, the execution engine 220 is a real-time software control system with hard real-time requirements. Real-time software control systems are software systems that are required to execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

The state estimator 240, on the other hand, typically has more flexibility in operation and can be configured to generate symbolic state predictions at a lower frequency than the execution engine 220 is providing commands 265 to the robot 270. Absent an updated symbolic state 255, the execution engine 220 can assume that the symbolic state has not changed, which can cause the execution engine 220 to keep using the same control policy.

This arrangement allows the predicate classifiers and the state estimator to use more sophisticated algorithms and computing power, which can result in less noise and better accuracy in the predictions. In addition, it allows the predicate classifiers to possibly use more complicated sensor data. For example, the execution engine 220 might only use force sensors with force feedback control, while the predicate classifiers might use high-definition cameras with sophisticated object recognition and pose estimation algorithms. Thus, the type and number of sensors used by the predicate classifier subsystem 230 need not be the same as the sensors used by the execution engine 220.

In execution, the robot 280 can continually execute the commands 265 specified explicitly or implicitly by the execution engine 220 to perform a control policy of the task being executed. The robot 270 can be a real-time robot, which means that the robot 270 can be programmed to continually execute the commands 265 according to a highly constrained timeline. For example, the robot 270 can expect a command from the execution engine 220 at a particular frequency, e.g., 100 Hz or 1 kHz. If the robot 270 does not receive a command that is expected, the robot can enter a fault mode and stop operating.

When the symbolic state 255 changes, the execution engine 220 can change control policies accordingly. As one example, the execution engine 220 can switch to a control policy that causes the robot to perform a search procedure 235, which in this example is a Lissajous search in which the manipulator follows a varying "figure eight" search pattern centered on an estimated insertion point.

Figure 3:
FIG. 3 is a list of example tasks and predicate values

FIG. 3. illustrates a list of sensor modalities 330 and symbolic states 320 in an example insertion task with the corresponding predicate values 310. A mapping 300 is presented showing a similar correlation. Symbolic states 320 that are determined by each sensor modality 330 to be "true" are indicated by a box with a cross-hatched pattern. Symbolic states 320 that are determined to be "false" by a sensor modality 330 are indicated by a box with an empty fill pattern. No box is shown when a sensor modality 330 does not evaluate the corresponding symbolic state 320. In this example, predicates are defined to maximize the performance of each sensor modality 330. Motion, or force-based, predicates are indicated with underlining while image-based predicates are indicated without underlining. As illustrated for this example insertion task, the symbolic state 320 determined by the system transitions from ABOVE, to ONSURFACE, to ALIGNED, and finally, to IN. These transitions are performed cleanly, with minimal noise, and without rapid "flipping" between symbolic states.

In another example of an implementation with a peg and hole task, an image classifier can reliably detect when the peg is positioned above or below the hole surface, but it is less reliable for a motion and force-based classifier to determine the same without exact information about the surface height. While a 1-to-1 mapping between states and predicates is possible, defining symbolic states with a set of more nuanced predicates can simplify the classification problems and improve the overall performance. To minimize the amount of data required to train classifiers for motion and force-based predicates, the system can use logistic regression on a set of handcrafted features.

For example, to detect the predicate in-contact (a, b), the system can use the force magnitude as a feature. It is possible to train neural networks to classify the predicates without handcrafted features, but the predicates for this example real-world task are simple enough that doing so would be unnecessary and perform worse in generalization given the small dataset.

Figure 4:
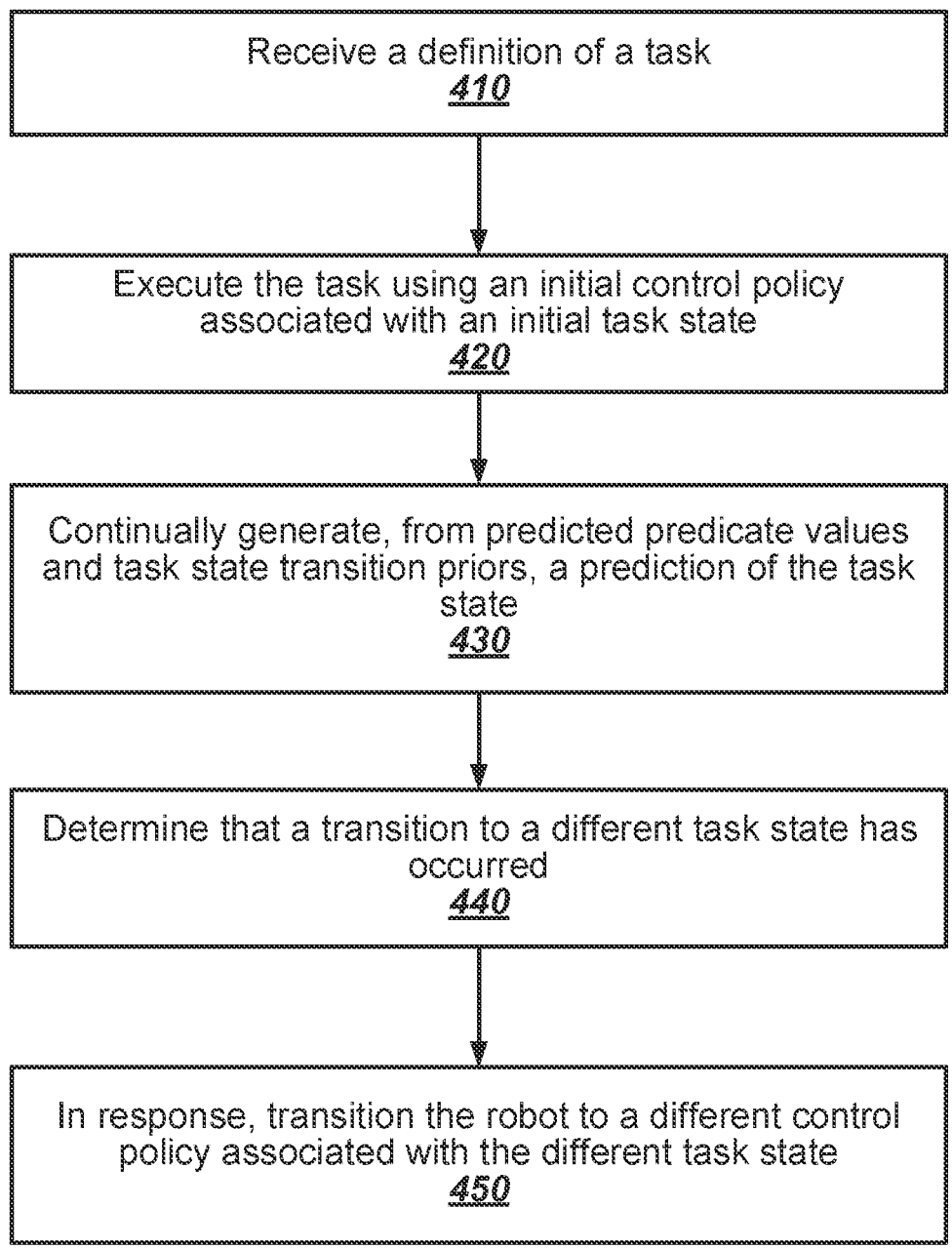
FIG. 4 is an example flowchart showing representative method steps.

FIG. 4 is a flowchart of an example process for using symbolic states for controlling a robotic task. In general, the process uses predicate classifiers to determine when a transition to a new symbolic state has occurred. If so, the robot uses a different control policy. The example process can be performed by a system of one or more computers in one or more locations in communication with a robot and programmed in accordance with this specification. The example process will be described as being performed by a system of one or more computers.

While this process is demonstrated for a state machine, this process can also be applied to other high-level execution models such as behavior trees, task planners, and Robust Logical-Dynamical Systems. For example, a robot that makes decisions on what actions to take as part of a decision tree may select a course of action based on the aggregation of predicate classifiers associated with each option. In another example, a robot that is assigned a task plan may use predicate classifiers to judge their completion progress and the sequencing of subsequent steps in the plan.

The system receives a definition of a task (410). A robotic task can be defined by a task state machine having a plurality of task states, with each task state having a respective control policy. For example, a robot task for the insertion of an electronic connector into a junction can have different control policies for the "ALIGNED" and "INSERTED" task states.

The system executes the task using an initial control policy associated with an initial task state (420). The initial task state defines the initial conditions for the task state machine and acts as a reference point for the robot. In the electronic connector insertion example where the robot begins above the insertion point, this state may be named "ABOVE". Other embodiments that complete other tasks may choose to use a different initial task state.

The system continually generates, from predicted predicate values and task state transition prior belief states, a prediction of the current task state as it performs the task (430). As described above, the system can define each symbolic state as a composition of predicate values and can continually predict a current symbolic state by continually updating predicted predicate values.

In some implementations, the system uses a framework that builds on Bayesian state estimation with virtual sensors to encode high-dimensional observations to low-dimensional vectors. To achieve better data efficiency, the virtual sensors can be trained to output binary predicates rather than an implicit representation of symbolic states learned end-to-end. The predicates can be defined as binary atomic properties composing symbolic states. After learning virtual sensors for predicates, generative observation models can then be applied, e.g., using Gaussian Mixture Models (GMMs), to the sensor outputs. The generative models help smooth out prediction errors from the noisy predicate sensors. The two-step training process outlined in this method allows robust symbolic state estimators for high-dimensional observations, while requiring only a small robot-environment interaction dataset.

The domain for this Bayesian framework can be described by the 6-tuple $<S, \Phi, A, T, \Omega, O>$ where $S$ is the set of symbolic states, $\Phi$ is the set of predicates that compose the symbolic states, $A$ is the set of actions, $T$ is the set of state transition probabilities, $\Omega$ is the set of observations, and $O$ is the set of conditional observation probabilities.

A belief state represents the agent's estimate of the symbolic state as a probability distribution over the states. In one example, at each time step, the belief state $b(s)$ is updated per the below equation:

$$b(s) \propto O(o|s, a) \sum_{s_{prev}} T(s|s_{prev}, a) b(s_{prev})$$

Where $s_{prev}, s \in S$ are unobservable symbolic states, $a \in A$ is the action performed at $s_{prev}$ to transition to $s$ with probability $T(s|s_{prev}, a)$, and $o \in \Omega$ is the observation received at $s$. The probability $T(s|s_{prev}, a)$ and the task state transition prior belief state $b(s_0)$ are estimated from state visit counts in the training data. The conditional observation probability $O(o|s, a)$ can be difficult to compute with traditional estimation methods without a parameterized distribution, since it requires normalizing over the entire observation space. To circumvent this issue, this method uses binary predicate classifiers as an intermediate representation, serving as a virtual sensor to reduce the dimensionality of observations.

Predicates $\phi \in \Phi$ define binary properties of objects, usually summarizing geometric information, such as inside (a, b) to indicate that object a is inside b. Symbolic states $s \in S$ are defined as sets of predicates $\{\phi_1^a, \phi_2^a, \ldots, \phi_{K_a}^a\}$, where $K^S$ is the number of predicates determined by s. For example, the symbolic state representing when a robot manipulator has fully inserted a peg into a hole could be $s_{inserted} = \{inside\ (peg,\ hole),\ \neg\ above\ (peg;\ surface)\}$.

This method trains virtual predicate sensors as binary classifiers $h\Phi(o)$ that each outputs a noisy estimate of the probability that predicate $\Phi$ is true. The symbolic state s can then be inferred from noisy "virtual observations"

$$\left[h_{\Phi_1^s}(o), h_{\Phi_2^s}(o), \ldots, h_{\Phi_{K^s}^s}(o)\right].$$

Symbolic states do not need to specify the truth value of all predicates. Given a ground truth state s, the predicate sensors are then trained in one instance with a variant of the cross entropy loss below:

$$L = \sum_{k=1}^{K^S} \phi_k^s \log h_{\phi_k^s}(o) + (1 - \phi_k^s) \log \left(1 - h_{\phi_k^s}(o)\right)$$

Rather than computing the cross entropy for all the predicates, this method only computes it for the predicates whose truth values are determined by the ground truth state s. In practice, this can be implemented by using a Boolean mask $\{0, 1\}^{|\Phi|}$ to mask out predicate predictions for predicates not determined by s.

If a virtual sensor does not output parameters for a parameterized probability distribution, the observation probability $O(h_\Phi(o)|s, a)$ must be normalized over its outputs $h_\Phi(o)$. While some past works suggest approximating this normalization step with sampling, this is computationally expensive. If the virtual sensors are trained to output categorical variables, as is the case with our method's predicate sensors, the normalization can be approximated by summing over the categorical variables. Using this approximation, however, discards information contained in the continuous probabilities output by the predicate sensors.

For example, suppose a noisy predicate sensor outputs $h_\phi \sim TN(0.2, 1)$ when $\Phi$=false and $h_\phi \sim TN(0.4, 0.3)$ when $\Phi$=true. Where TN denotes a normal distribution truncated within [0, 1]. If we discretize the sensor outputs into two bins, $(h_\Phi < 0.5) \to (\Phi = false)$ and $(h_\Phi \geq 0.5) \to (\Phi = true)$, then observing $h_\Phi = 0.4$ leads to predicting $\Phi$=false, since $h_\Phi < 0.5$. However, the predicate is more likely to be true, since 0.4 is the mean of $h_\Phi$ when $\Phi$=true.

To capture the fidelity of continuous predictions without resorting to sampling, this method represents the observation model with GMMs fit to the virtual predicate sensor output logits, as in one example given below:

$$O(h_\phi(o)|s,a) = \text{GMM}_{s,a}(\log h_\phi(o))$$

Because GMMs are parameterized probability distributions, the normalization over the observation space can be computed in closed form. Fitting the GMMs over the same dataset used to train the predicate classifiers could result in overfitting, so this method instead uses the validation set.

In one implementation, this method utilizes Bayesian state estimation to integrate observations from multiple sensors. Each sensor observation is considered conditionally independent given the state and action, and thus the conditional observation probability O(o|s, a) is computed as the product of all observation probabilities $O(o_{sensor}|s, a)$. In one instance of this method's framework, there is one virtual sensor per predicate, so the set of sensors is equivalent to the set of predicates:

$$O(o|s, a) = \prod_\phi O(h_\phi(o)|s, a)$$

To integrate virtual predicate sensors from multiple physical sensor modalities, in one instance of this method, a predicate is defined for each sensor modality. For example, suppose it is desired to identify a symbolic state where the robot end-effector is in contact with a surface from both visual and force observations. Two predicates can be introduced, visual-in-contact and force-in-contact, and the contact symbolic state defined to be the conjunction of these two predicates {visual-in-contact, force-in-contact}.

The predicate classifiers can be trained in a number of different ways depending on the type of sensors being used. However, in some implementations, the proposed framework is agnostic to the classifier implementation, with the only requirement being that the classifier outputs a value between 0 and 1.

As one example, the system can train predicate classifiers for motion and force-based sensors. To minimize the amount of data required to train classifiers for motion and force-based predicates, the system can utilize logistic regression on a set of handcrafted features. For example, to detect the predicate in-contact (a, b), this method can simply use the force magnitude as a feature. It is possible to train neural networks to classify the predicates without handcrafted features, but the predicates for this example real-world task are simple enough that doing so would be unnecessary and perform worse in generalization given the small dataset.

As another example, the system can train predicate classifiers for image-based sensors. For image-based predicate classification, in one instance of this method, SimCLRv2 is adopted with a ResNet-50 model as the backbone network, with an added linear layer on top for predicate classification. SimCLRv2 has been shown to be effective for fine-tuning classifiers by augmenting small datasets with random image transformations. In one instance, the network is pre-trained on ImageNet, and the linear layer is fine-tuned on a collected dataset of images, for example 47,752 images, collected over a number of policy execution runs, for example 120 runs, across a number of tasks, for example 8 tasks. In one instance this method uses random cropping and color distortion for data augmentation.

The system determines if a task state transition from a prior belief state has occurred (440). In the electronic connector insertion task example, the decision to transition the task state from "ALIGNED" to "INSERTED" may be conducted when the system detects a certain combination of predicate values derived from force data and video data. However, in this same example, if the task state machine detects the same force data with conflicting video data, it may instead choose to update the task state to "MISSED" to allow failure recovery. Other embodiments may choose to use different metrics or sensor data. This determination may be performed with a certain combination of sensor data obtained from the robot or the task state machine. Sensor data can include video, audio, force, acceleration, friction, voltage, current, and any other parameters that can be reasonably sensed or measured.

The system transitions the robot to using a different control policy associated with the new task state (450). In general, the system switches the robot from executing one control policy to executing another control policy for the newly updated task state. In the electronic connector insertion example, if the task state machine detects the transition to the "ALIGNED" task state from the "ABOVE" task state, it may assign a control policy that limits the movement of the robot arm in the X and Y directions. Additionally, in this same example, if the task state machine detects a transition to the "INSERTED" task state from the "ALIGNED" task state, it may direct the robot arm to cease inward movement in the Z direction. Other embodiments for this task, or other tasks, may choose to implement different control policies for different task state transitions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  receiving a definition of a task having multiple task states, wherein each task state is associated with a different respective control policy, and wherein each task state is defined by a composition of one or more predicate values;
  executing the task using an initial control policy associated with an initial task state for the task;

during execution of the task, continually generating, from sensor data, one or more predicted predicate values for each of one or more predicates defining the multiple task states and generating, from the predicted predicate values and one or more task state transition prior belief states, a resulting prediction of the task state that the task is currently in; and upon determining that a transition to a different task state has occurred, transitioning the robot to using a different control policy associated with the different task state of the task.

Embodiment 2 is the method of embodiment 1, wherein each predicate classifier uses sensor data from only a single sensor.

Embodiment 3 is the method of any one of embodiments 1-2, wherein a first predicate classifier uses only image data.

Embodiment 4 is the method of embodiment 3, wherein a second predicate classifier uses only robot position, velocity, and force data.

Embodiment 5 is the method of any one of embodiments 1-4, wherein generating the prediction of the task state comprises using the predicted predicate values as input to a model trained to generate a predicted task state from predicate compositions.

Embodiment 6 is the method of any one of embodiments 1-5, wherein the task is a connector insertion task and wherein the task states comprise an above task state representing that the connector is above a socket, an on-surface task state representing that the connector has contacted the surface of an object, an aligned task state representing that the connector is aligned with the socket, or an in task state that represents that the connector has been inserted.

Embodiment 7 is the method of any one of embodiments 1-6, wherein the plurality of task states include one or more task states representing error conditions.

Embodiment 8 is a system comprising: one or more computers and one or more storage devices storing instructions that are operable, when executed by the one or more computers, to cause the one or more computers to perform the method of any one of embodiments 1 to 7.

Embodiment 9 is a computer storage medium encoded with a computer program, the program comprising instructions that are operable, when executed by data processing apparatus, to cause the data processing apparatus to perform the method of any one of embodiments 1 to 7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A method for controlling a robot comprising:
   receiving a definition of a task, wherein:
      the task has multiple task states,
      each task state is associated with a different respective control policy, and
      each task state is defined by a composition of one or more predicate values;
   executing the task using an initial control policy associated with an initial task state for the task;
   during execution of the task:
      continually generating, from sensor data, one or more predicted predicate values for each of one or more predicates defining the multiple task states, and
      generating, from the one or more predicted predicate values and one or more task state transition prior belief states, a resulting prediction of the task state that the task is currently in; and
   when a transition from the initial task state to a different task state has occurred, controlling the robot using a different control policy associated with the different task state of the task.

2. The method of claim 1, wherein each predicate classifier of a plurality of predicate classifiers uses sensor data from only a single sensor.

3. The method of claim 1, wherein a first predicate classifier uses only image data.

4. The method of claim 3, wherein a second predicate classifier uses only robot position, velocity, and force data.

5. The method of claim 1, wherein generating the prediction of the task state comprises using the one or more predicted predicate values as input to a model trained to generate a predicted task state from predicate compositions.

6. The method of claim 1, wherein the task is an insertion task, and wherein the task states comprise an above task state representing that a connector is above a socket, an on-surface task state representing that the connector has contacted the surface of an object, an aligned task state representing that the connector is aligned with the socket, or an in task state that represents that the connector has been inserted.

7. The method of claim 1, wherein the plurality of task states include one or more task states representing error conditions associated with the robot.

8. A system comprising:
one or more computers; and
one or more storage devices storing instructions that are operable, when executed by the one or more computers, to cause the one or more computers to perform operations comprising:
receiving a definition of a task, wherein:
the task has multiple task states,
each task state is associated with a different respective control policy, and
each task state is defined by a composition of one or more predicate values;
executing the task using an initial control policy associated with an initial task state for the task;
during execution of the task:
continually generating, from sensor data, one or more predicted predicate values for each of one or more predicates defining the multiple task states, and
generating, from the one or more predicted predicate values and one or more task state transition prior belief states, a resulting prediction of the task state that the task is currently in; and
when a transition from the initial task state to a different task state has occurred, controlling a robot using a different control policy associated with the different task state of the task.

9. The system of claim 8, wherein each predicate classifier of a plurality of predicate classifiers uses sensor data from only a single sensor.

10. The system of claim 8, wherein a first predicate classifier uses only image data.

11. The system of claim 10, wherein a second predicate classifier uses only robot position, velocity, and force data.

12. The system of claim 8, wherein generating the prediction of the task state comprises using the one or more predicted predicate values as input to a model trained to generate a predicted task state from predicate compositions.

13. The system of claim 8, wherein the task is an insertion task, and wherein the task states comprise an above task state representing that a connector is above a socket, an on-surface task state representing that the connector has contacted the surface of an object, an aligned task state representing that the connector is aligned with the socket, or an in task state that represents that the connector has been inserted.

14. The system of claim 8, wherein the plurality of task states include one or more task states representing error conditions associated with the robot.

15. One or more non-transitory computer storage media encoded with computer program instructions that when executed by one or more computers cause the one or more computers to perform operations comprising:
receiving a definition of a task, wherein:
the task has multiple task states,
each task state is associated with a different respective control policy, and
each task state is defined by a composition of one or more predicate values;
executing the task using an initial control policy associated with an initial task state for the task;
during execution of the task:
continually generating, from sensor data, one or more predicted predicate values for each of one or more predicates defining the multiple task states, and
generating, from the one or more predicted predicate values and one or more task state transition prior belief states, a resulting prediction of the task state that the task is currently in; and
when a transition from the initial task state to a different task state has occurred, controlling a robot using a different control policy associated with the different task state of the task.

16. The one or more computer storage media of claim 15, wherein each predicate classifier of a plurality of predicate classifiers uses sensor data from only a single sensor.

17. The one or more computer storage media of claim 15, wherein a first predicate classifier uses only image data.

18. The one or more computer storage media of claim 17, wherein a second predicate classifier uses only robot position, velocity, and force data.

19. The one or more computer storage media of claim 15, wherein generating the prediction of the task state comprises using the one or more predicted predicate values as input to a model trained to generate a predicted task state from predicate compositions.

20. The one or more computer storage media of claim 15, wherein the task is an insertion task, and wherein the task states comprise an above task state representing that a connector is above a socket, an on-surface task state representing that the connector has contacted the surface of an object, an aligned task state representing that the connector is aligned with the socket, or an in task state that represents that the connector has been inserted.

* * * * *